United States Patent
Zhang

(10) Patent No.: US 10,426,276 B2
(45) Date of Patent: Oct. 1, 2019

(54) CONTROL SYSTEM FOR BABY SWING AND CONTROL METHOD FOR BABY SWING

(71) Applicant: Jiaxing JinTong Electronics Co., Ltd., Jiaxing, Zhejiang (CN)

(72) Inventor: Qiang Zhang, Zhejiang (CN)

(73) Assignee: Jiaxing JinTong Electronics Co., Ltd., Jiaxing (CN)

( * ) Notice: Subject to any disclaimer, the term of this patent is extended or adjusted under 35 U.S.C. 154(b) by 0 days.

(21) Appl. No.: 16/015,219

(22) Filed: Jun. 22, 2018

(65) Prior Publication Data

US 2019/0159606 A1 May 30, 2019

(30) Foreign Application Priority Data

Nov. 29, 2017 (CN) .......................... 2017 1 1229860

(51) Int. Cl.
*A63G 9/16* (2006.01)
*A47D 9/02* (2006.01)
*A47D 13/10* (2006.01)
*G05B 15/02* (2006.01)

(52) U.S. Cl.
CPC ............. *A47D 13/105* (2013.01); *A47D 9/02* (2013.01); *G05B 15/02* (2013.01)

(58) Field of Classification Search
CPC . A63G 9/00; A63G 9/16; A63G 19/20; A47C 3/0255

USPC ...... 472/119–125; 5/108–109, 127; 318/443, 318/640

See application file for complete search history.

(56) References Cited

U.S. PATENT DOCUMENTS

| | | | |
|---|---|---|---|
| 6,339,304 B1* | 1/2002 | Allison | A47D 13/105 |
| | | | 318/443 |
| 7,905,791 B2* | 3/2011 | Guang | 340/671 |
| 8,784,227 B2* | 7/2014 | Speedie | A47D 9/02 |
| | | | 472/119 |
| 2011/0207541 A1* | 8/2011 | Tuckey | A47D 13/105 |
| | | | 472/119 |

* cited by examiner

Primary Examiner — Kien T Nguyen

(57) ABSTRACT

The invention discloses a control system for a baby swing. The control system comprises a driving motor for applying a force and a control device for controlling the driving motor. The control device comprises a gyroscope disposed on a swing arm for detecting an angular velocity of the swing arm when the swing arm passes the lowest point and outputting an angular velocity detection signal; and a control module coupled to an output end of the gyroscope for receiving and responding to the angular velocity detection signal, so as to adjust a duty ratio of the driving motor in energization and change the action time of the driving motor. The control system for the baby swing according to the invention achieves the same swing angle for babies of different weights.

8 Claims, 3 Drawing Sheets

Starting a control button 4, and controlling, by a control module 3, the starting voltage of both ends of a driving motor 1 to gradually increase according to a starting signal;

comparing the maximum value of an angular velocity detection signal in a single swing period with a first predetermined value, and if the angular velocity detection signal is less than the first predetermined value, increasing, by the control module 3, the starting voltage of both ends of the driving motor 1 next time according to the angular velocity detection signal;

when the angular velocity detection signal is less than a second predetermined value in the single swing period, controlling, by the control module 3, the driving motor 1 to shut down according to the angular velocity detection signal;

when the angular velocity detection signal is equal to zero in the single swing period, applying, by the control module 3, reverse starting voltage to both ends of the driving motor 1 according to the angular velocity detection signal;

adjusting, by a swing angle control switch 5, the swing angle, so that the control module 3 increases or decreases the first predetermined value according to the adjusted swing angle, and returning to step B.

Fig. 3

CONTROL SYSTEM FOR BABY SWING AND CONTROL METHOD FOR BABY SWING

CROSS REFERENCES TO RELATED APPLICATIONS

This application claims the benefit of Chinese Patent Application No. 201711229860.2 filed on Nov. 29, 2017. The entire contents of the above application are hereby incorporated by reference in their entirety.

TECHNICAL FIELD

The invention relates to the technical field of baby products, in particular to a control system for a baby swing and a control method for the baby swing.

BACKGROUND ART

Parents all know that regular swing can have a considerable soothing effect on babies, and this method is often used to soothe the babies before they sleep or when they cry. Therefore, products such as baby swings, baby rocking chairs, and cradles are available on the market to provide similar functions for use by caregivers.

A baby swing comprises a swing frame and a swing bed rotatably connected to the swing frame on both sides through swing arms. Most baby swings available now are electric baby swings which are driven by a power supply, a driving circuit is disposed inside to control a driving motor, so as to drive a transmission mechanism, and when the transmission mechanism is driven, the swing bed can be driven to swing back and forth. A caregiver nearby can operate a control button on the baby swing to control the driving circuit, so as to control the output torque of the driving motor, in this way, the swing bed can be controlled to make a simple pendulum motion at a fixed swing angle.

A conventional baby swing controls the swing angle through a grating which can sense the swing angle, but it can only turn on or off a motor when swinging to a predetermined angle, in general, the motor is turned off when the baby swing swings to the predetermined angle, the swing bed continues to swing upwards by means of its inertia, when the swing bed returns to the predetermined angle again, the motor is turned on reversely, so that the swing bed swings in the opposite direction, and the process is repeated; but in this process, the angles of upward swing realized by inertia are different when the babies in the swing bed are of different weights, causing difference between the actual swing angles and the predetermined angle of the swing bed for babies of different weights.

Therefore, a new solution is required to solve the problem.

SUMMARY OF THE INVENTION

In view of the deficiencies in the prior art, an object of the invention is to provide a control system for a baby swing so as to achieve the same swing angle for babies of different weights.

The above technical object of the invention is realized through the following technical solution: a control system for a baby swing comprises a driving motor for applying a force and a control device for controlling the driving motor, and the control device comprises a gyroscope disposed on a swing arm for detecting the angular velocity of the swing arm when the swing arm passes the lowest point and outputting an angular velocity detection signal; and a control module coupled to an output end of the gyroscope for receiving and responding to the angular velocity detection signal, so as to adjust the duty ratio of the driving motor in energization and change the action time of the driving motor.

By adopting the above technical solution, regardless of the weight of the baby placed in the swing bed, the swing angle of the swing bed can reach a set angle, the angular velocity of the swing arm is continuously detected by the gyroscope disposed on the swing arm, and the actual angular velocity at which the swing bed passes the lowest point during a single swing, that is, the maximum angular velocity during the single swing, is recorded. The formula $\omega^2 = 2g(1-\cos\alpha)/R$ can be used, wherein w is the theoretical angular velocity at which the swing bed swings to the lowest point, a is the maximum swing angle of the swing bed, and R is the length of the swing arm (namely the swing radius), so that the set swing angle (namely the maximum swing angle of the swing bed) is converted into the angular velocity at which the swing bed passes the lowest point during the single swing. Therefore, the gyroscope disposed on the swing arm detects the actual angular velocity at which the swing bed passes the lowest point, and sends the output angular velocity detection signal to the control module, and the control module compares the angular velocity detection signal with the theoretical angular velocity value, so as to adjust the duty ratio of the driving motor in energization, thereby changing the time of the driving motor acting on the swing arm, and avoiding difference between the actual swing angles and the predetermined swing angle of the swing bed for babies of different weights due to the fixed time of energization of the driving motor. In addition, since the control module adjusts the duty ratio of the motor and a pulse power supply mode is adopted, compared with the traditional driving motor power supply mode (DC supply, whole-course energization), more energy and electricity can be saved, and the battery replacement frequency of the baby swing of the invention is greatly reduced.

Further, the control module has a built-in first predetermined value, and when the angular velocity detection signal detected by the gyroscope when the swing arm passes the lowest point is less than the first predetermined value, the control module increases the duty ratio of the driving motor in energization according to the angular velocity detection signal, so as to increase the action time of the driving motor.

By the adoption of the above technical solution, the gyroscope detects the angular velocity when the swing arm passes the lowest point, and outputs the angular velocity detection signal to the control module, and the control module compares the detected angular velocity with the first predetermined value, when the angular velocity detection signal detected by the gyroscope when the swing arm passes the lowest point is less than the first predetermined value, it indicates that the actual swing angle is less than the set swing angle, so the control module increases the duty ratio of the driving motor in energization, so as to increase the time of the driving motor acting on the swing arm, thereby increasing the swing angle of the swing bed to the set swing angle.

Further, a control button is coupled to the control module for outputting a starting signal; when the control button is switched on, the control module controls the duty ratio of the driving motor in energization to gradually increase according to the starting signal.

By adopting the above technical solution, when the control button is pressed, the baby swing is started and starts to swing, and after the control module receives the starting signal, the duty ratio of the driving motor in energization is controlled to gradually increase, so that the swing angle is not forced to increase to the set angle during startup, pauses caused by forcible pushing are avoided, and the comfortable experience of babies is not affected.

Further, the control module has a built-in second predetermined value, during startup, the maximum value of the angular velocity detection signal in a single swing period is compared with the first predetermined value, and if the angular velocity detection signal is less than the first predetermined value, the control module increases the duty ratio of the driving motor next time the driving motor is energized according to the angular velocity detection signal; when the gyroscope detects that the swing arm swings upwards and the angular velocity detection signal is less than the second predetermined value in the single swing period, the control module controls the driving motor to shut down according to the angular velocity detection signal, and the second predetermined value is an angular velocity value close to zero; when the swing bed passes the lowest point in the single swing period, the control module applies reverse starting voltage to both ends of the driving motor according to the angular velocity detection signal.

By adopting the above technical solution, the first predetermined value is the theoretical angular velocity converted from the set swing angle according to the formula; the second predetermined value is an angular velocity close to zero when swinging to the left or right, at which point the swing bed can swing by means of inertia to the set swing angle; when the swing bed passes the lowest point in the single swing period (that is, when the angular velocity detection signal reaches its maximum in the single swing period), the control module applies reverse starting voltage to both ends of the driving motor according to the angular velocity detection signal, and compares the maximum value of the angular velocity detection signal (namely the actual angular velocity) in the single swing period with the first predetermined value, so as to increase or decrease the duty ratio of the driving motor in energization this time according to the angular velocity detection signal, thereby guaranteeing the consistency of the swing angle of the swing bed, meanwhile, due to the setting of the second predetermined value, the energization time of the driving motor is reduced, and therefore more energy and electricity are saved.

Further, a swing angle control switch for adjusting the swing angle is coupled to an input end of the control module.

By adopting the above technical solution, the set swing angle can be adjusted (that is, adjusting the first predetermined value) through the swing angle control switch, so that the control module compares the actual angular velocity detected when the swing bed passes the lowest point with the first predetermined value, so as to adjust the duty ratio of the driving motor in energization, thereby allowing the swing bed to reach different set swing angles to realize different soothing effects for different babies.

The invention also provides a control method for a baby swing, comprising the following steps:
A. setting a built-in first predetermined value and a built-in second predetermined value of a control module, starting a control button, and control, by the control module, the duty ratio of a driving motor in energization to gradually increase according to a starting signal;
B. comparing the maximum value of an angular velocity detection signal in a single swing period with the first predetermined value, and if the maximum value of the angular velocity detection signal is less than the first predetermined value, increasing, by the control module, the duty ratio of the driving motor next time the driving motor is energized according to the angular velocity detection signal;
C. when the angular velocity detection signal is less than the second predetermined value in the single swing period, controlling, by the control module, the driving motor to shut down according to the angular velocity detection signal;
D. when the angular velocity detection signal is equal to zero in the single swing period, applying, by the control module, reverse starting voltage to both ends of the driving motor according to the angular velocity detection signal.

Further, after step D, the method also comprises:
E. adjusting, by a swing angle control switch, the swing angle, so that the control module increases or decreases the first predetermined value according to the adjusted swing angle, and return to step B.

In summary, the invention has the following beneficial effects: the gyroscope disposed on the swing arm detects and outputs the angular velocity detection signal which is sent to the control module, and the control module adjusts the duty ratio of the driving motor in energization, thereby changing the action time of the driving motor, and avoiding difference between the actual swing angles and the predetermined swing angle of the swing bed for babies of different weights due to the fixed time of energization of the driving motor; in addition, since the control module adjusts the duty ratio of the motor in energization, compared with the traditional driving mode (driving through whole-course energization of a motor), more energy and electricity can be saved, and the battery replacement frequency of the baby swing of the invention is greatly reduced.

BRIEF DESCRIPTION OF THE DRAWINGS

FIG. 3 is a flowchart of a second embodiment.
In the drawings: 1. driving motor; 2. gyroscope; 3. control module; 4. control button; 5. swing angle control switch; 6. swing frame; 7. swing arm; and 8. swing bed.

DETAILED DESCRIPTION OF THE INVENTION

The invention will be described in detail below with reference to the accompanying drawings and embodiments.

Figure 1:
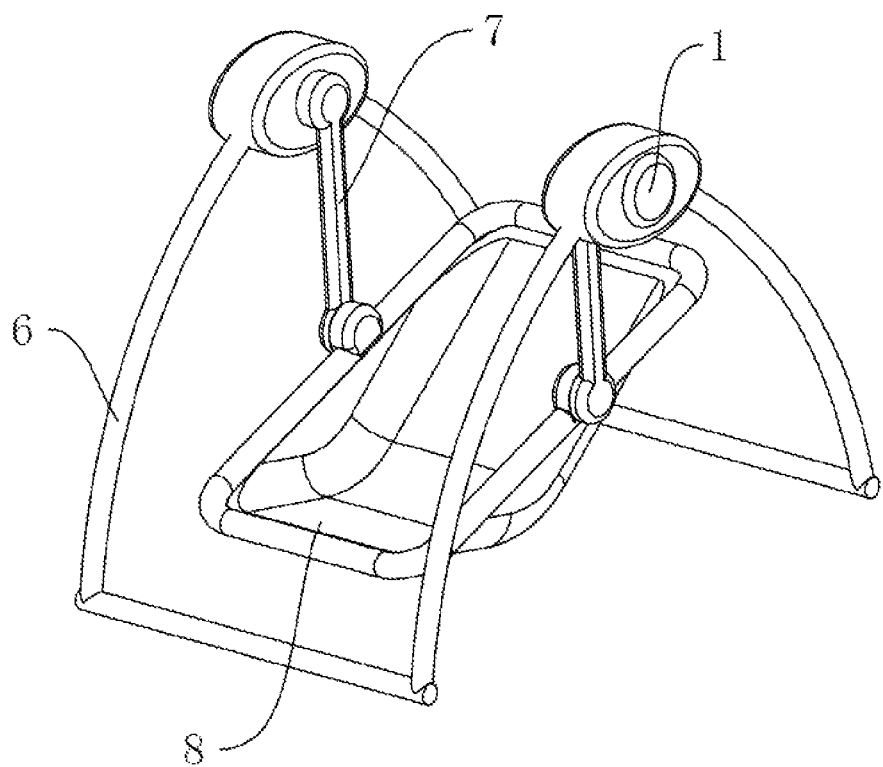
FIG. 1 is a schematic diagram of an overall structure of the invention.

As shown in FIG. 1, a baby swing comprises a swing frame 6, and a swing bed 8 rotatably connected to the swing frame 6 on both sides through swing arms 7.

Figure 2:
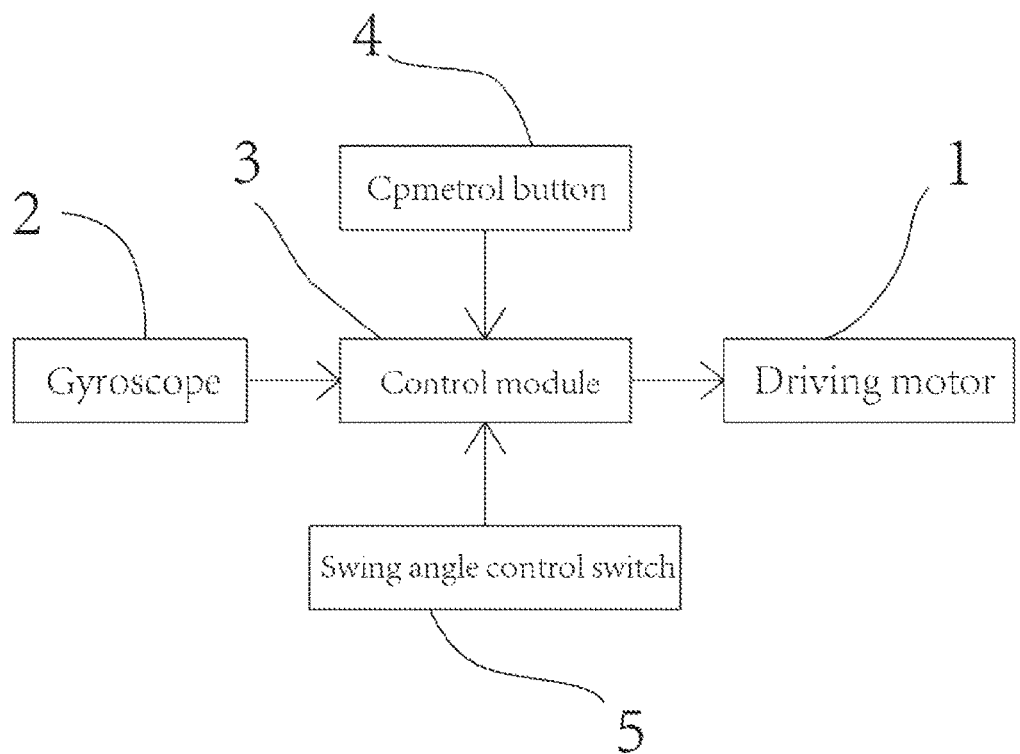
FIG. 2 is a system block diagram of a first embodiment.

Embodiment 1 a control system for the baby swing, as shown in FIG. 1 and FIG. 2, comprises a driving motor 1 for applying a force to control the swing arms 7 to swing, and a control device for controlling the driving motor 1, the drive motor 1 is mounted on the swing frame 6, and an output shaft of the driving motor is connected to the upper end of the corresponding swing arm 7; wherein the control device comprises a gyroscope 2 fixed to the corresponding swing arm 7 for detecting the angular velocity of the swing arm 7 when the swing arm 7 passes the lowest point and outputting an angular velocity detection signal; and a control module 3 coupled to an output end of the gyroscope 2 for receiving and responding to the angular velocity detection signal, so as to adjust the duty ratio of the driving motor 1 in energization and change the action time of the driving motor 1. The control module 3 is a control circuit mainly composed of a single-chip microcomputer.

Regardless of the weight of the baby placed in the swing bed, the swing angle of the swing bed can reach a set angle, the angular velocity of the swing arm 7 is continuously detected through the gyroscope 2 disposed on the swing arm 7, the actual angular velocity at which the swing bed 8 passes the lowest point during a single swing, that is, the maximum angular velocity during the single swing, is recorded, and can be calculated by the formula $\omega^2=2\,g(1-\cos\alpha)/R$, wherein w is the theoretical angular velocity at which the swing bed 8 swings to the lowest point, a is the maximum swing angle of the swing bed 8, and R is the length of the swing arm 7 (namely the swing radius), so that the set swing angle (namely the maximum swing angle of the swing bed 8) is converted into the angular velocity at which the swing bed 8 passes the lowest point during the single swing. Therefore, the gyroscope 2 disposed on the swing arm 7 detects the actual angular velocity at which the swing bed 8 passes the lowest point, and sends the output angular velocity detection signal to the control module 3, and the control module 3 adjusts the duty ratio of the driving motor 1 in energization, thereby changing the action time of the driving motor 1, and avoiding difference between the actual swing angles and the predetermined swing angle of the swing bed 8 for babies of different weights due to the fixed time of energization of the driving motor 1. In addition, since the control module adjusts the duty ratio of the motor in energization and a pulse power supply mode is adopted, compared with the traditional driving motor power supply mode (DC supply, whole-course energization), more energy and electricity can be saved, and the battery replacement frequency of the baby swing of the invention is greatly reduced.

The control module 3 has a built-in first predetermined value, and when the angular velocity detection signal detected by the gyroscope 2 when the swing arm 7 passes the lowest point is less than the first predetermined value, the control module 3 increases the duty ratio of the driving motor 1 in energization according to the angular velocity detection signal, so as to increase the action time of the driving motor 1, thereby increasing the swing angle of the swing bed 8 to the set swing angle.

A control button 4 is coupled to an input end of the control module 3 and disposed on the swing frame 6 for outputting a starting signal; when the control button 4 is switched on, the control module 3 controls the duty ratio of the driving motor 1 in energization to gradually increase according to the starting signal. The relationship between the angular velocity of the swing bed 8 and time during startup is calculated by the formula:

$$\frac{K_p}{Ti}\int_0^f e(t)dt,$$

the control module 3 controls the driving motor 1 to perform driving at a duty ratio of 50% during startup, the angular velocity of the swing bed 8 is detected after a predetermined period of time, if the angular velocity of the swing bed 8 is zero, the control module 3 controls the driving motor 1 to perform driving at a duty ratio of 100%, then the angular velocity of the swing bed 8 is detected after every predetermined period of time, if the angular velocity of the swing bed 8 is zero, the control module 3 applies reverse voltage to both ends of the driving motor, and the process is repeated till the swing bed 8 starts to slowly swing to the set angle; in this way, when the control button 4 is pressed, the baby swing is started and starts to swing, and since the control module 3 controls the duty ratio of the driving motor 1 in energization to gradually increase according to the starting signal, the swing angle is not forced to increase to the set angle during startup, pauses caused by forcible pushing are avoided, and the comfortable experience of babies is not affected.

Meanwhile, the control module 3 also has a built-in second predetermined value. During startup, the maximum value of the angular velocity detection signal in a single swing period is compared with the first predetermined value, and if the angular velocity detection signal is less than the first predetermined value, the control module 3 increases the duty ratio of the driving motor 1 next time the driving motor is energized according to the angular velocity detection signal. When the gyroscope 2 detects that the swing arm 7 swings upwards and the angular velocity detection signal output by the gyroscope 2 is less than the second predetermined value in the single swing period, the control module 3 controls the driving motor 1 to shut down according to the angular velocity detection signal, and the second predetermined value is an angular velocity value close to zero. When the swing bed 8 passes the lowest point in the single swing period, the control module 3 applies reverse starting voltage to both ends of the driving motor 1 according to the angular velocity detection signal. In this way, the control module 3 increases or decreases the duty ratio of the driving motor 1 next time the driving motor is energized according to the angular velocity detection signal, thereby guaranteeing the consistency of the swing angle of the swing bed 8.

In addition, a swing angle control switch 5 is coupled to an input end of the control module 3 for adjusting the swing angle, and the swing angle can be adjusted through the swing angle control switch 5 so as to realize different soothing effects for different babies.

Embodiment 2

A control method for the baby swing, as shown in FIG. 3, comprises the following steps:

A. setting a built-in first predetermined value and a built-in second predetermined value of a control module 3, starting a control button 4, and controlling, by the control module 3, the duty ratio of a driving motor 1 in energization to gradually increase according to a starting signal, so that the swing angle is not forced to increase to the set angle during startup, pauses caused by forcible pushing are avoided, and the comfortable experience of babies is not affected;

B. comparing the maximum value of an angular velocity detection signal in a single swing period with the first predetermined value, and if the maximum value of the angular velocity detection signal is less than the first predetermined value, increasing, by the control module 3, the duty ratio of the driving motor 1 next time the driving motor is energized according to the angular velocity detection signal;

C. when the angular velocity detection signal is less than the second predetermined value in the single swing period, controlling, by the control module 3, the driving motor 1 to shut down according to the angular velocity detection signal, so that the angular velocity at which the swing bed 8 reaches the highest point is exactly zero, which does not produce pauses during force application;

D. when the angular velocity detection signal is equal to zero in the single swing period, applying, by the control module 3, reverse starting voltage to both ends of the driving motor 1 according to the angular velocity detection signal, so that the swing bed 8 swings to the other side;

E. adjusting, by a swing angle control switch 5, the swing angle, so that the control module 3 increases or decreases the first predetermined value according to the adjusted swing angle, and return to step B.

The above are merely preferred embodiments of the invention. The scope of protection of the invention is not limited to the above embodiments. Any technical solution that belongs to the idea of the invention falls within the protection scope of the invention. It should be pointed out that those of ordinary skill in the art will appreciate that several improvements and modifications without departing from the principle of the invention shall also be deemed to be within the protection scope of the invention.

The invention claimed is:

1. A control system for a baby swing, comprising a swing frame (6), a swing bed (8) rotatably connected to the swing frame (6) on both sides through swing arms (7), a driving motor (1) for applying a force, and a control device for controlling the driving motor (1), characterized in that the control device comprises:
   a gyroscope (2) disposed on one swing arm (7) for detecting a maximum angular velocity of the swing arm (7) when the swing arm (7) passes a lowest point and outputting an angular velocity detection signal based on the maximum angular velocity;
   and a control module (3) coupled to an output end of the gyroscope (2) for
     receiving the angular velocity detection signal from the gyroscope (2),
     comparing the angular velocity detection signal with a built-in first predetermined value stored in the control module; and
     responding to the angular velocity detection signal based on the comparison, so as to adjust a duty ratio of the driving motor (1) in energization and change action time of the driving motor (1).

2. The control system for the baby swing according to claim 1, characterized in that the control module (3) has the built-in first predetermined value, and when the angular velocity detection signal detected by the gyroscope (2) when the swing arm (7) passes the lowest point is less than the first predetermined value, the control module (3) increases the duty ratio of the driving motor (1) in energization according to the angular velocity detection signal, so as to increase the action time of the driving motor (1).

3. The control system for the baby swing according to claim 2, characterized in that a control button (4) is coupled to the control module (3) for outputting a starting signal; and when the control button (4) is switched on, the control module (3) controls the duty ratio of the driving motor (1) in energization to gradually increase according to the starting signal.

4. The control system for the baby swing according to claim 3, characterized in that the control module (3) has a built-in second predetermined value, during startup, the maximum value of the angular velocity detection signal in a single swing period is compared with the first predetermined value, and if the angular velocity detection signal is less than the first predetermined value, the control module (3) increases the duty ratio of the driving motor (1) next time the driving motor is energized according to the angular velocity detection signal; when the gyroscope (2) detects that the swing arm (7) swings upwards and the angular velocity detection signal is less than the second predetermined value in the single swing period, the control module (3) controls the driving motor (1) to shut down according to the angular velocity detection signal, and the second predetermined value is an angular velocity value close to zero; and when the swing bed (8) passes the lowest point in the single swing period, the control module (3) applies reverse starting voltage to both ends of the driving motor (1) according to the angular velocity detection signal.

5. The control system for the baby swing according to claim 2, characterized in that a swing angle control switch (5) for adjusting the swing angle is coupled to an input end of the control module (3).

6. The control system for the baby swing according to claim 1, characterized in that a swing angle control switch (5) for adjusting the swing angle is coupled to an input end of the control module (3).

7. A control method for a baby swing, characterized by comprising the following steps:
   A. setting a built-in first predetermined value and a built-in second predetermined value of a control module (3), wherein the second predetermined value is an angular velocity value close to zero, starting a control button (4), and controlling, by the control module (3), a duty ratio of a driving motor (1) in energization to gradually increase according to a starting signal;
   B. comparing the maximum value of an angular velocity detection signal in a single swing period with the first predetermined value, and if the maximum value of the angular velocity detection signal is less than the first predetermined value, increasing, by the control module (3), the duty ratio of the driving motor (1) next time the driving motor is energized according to the angular velocity detection signal, wherein a gyroscope (2), disposed on one swing arm (7) of the baby swing, is configured for detecting the maximum value of the angular velocity detection signal when the swing arm (7) passes a lowest point in the single swing period;
   C. when the angular velocity detection signal is less than the second predetermined value in the single swing period, controlling, by the control module (3), the driving motor (1) to shut down according to the angular velocity detection signal; and
   D. when the angular velocity detection signal is equal to zero in the single swing period, applying, by the control module (3), reverse starting voltage to both ends of the driving motor (1) according to the angular velocity detection signal.

8. The control method for the baby swing according to claim 7, characterized in that after step D, the method further comprises:
   E. adjusting, by a swing angle control switch (5), the swing angle, so that the control module (3) increases or decreases the first predetermined value according to the adjusted swing angle, and returning to step B.

* * * * *